US012736904B2

(12) United States Patent
Nagamatsu et al.

(10) Patent No.: US 12,736,904 B2
(45) Date of Patent: Sep. 15, 2026

(54) SLIDING MEMBER CONTAINING TALC PARTICLES, IMAGE FIXING DEVICE, AND IMAGE FORMING APPARATUS

(71) Applicant: FUJIFILM Business Innovation Corp., Tokyo (JP)

(72) Inventors: Taiki Nagamatsu, Kanagawa (JP); Ryohei Yoshikawa, Kanagawa (JP); Hideaki Ohara, Kanagawa (JP); Kenji Kajiwara, Kanagawa (JP); Tomotake Inagaki, Kanagawa (JP); Hitoshi Komuro, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/064,660

(22) Filed: Feb. 26, 2025

(65) Prior Publication Data

US 2026/0056492 A1 Feb. 26, 2026

(30) Foreign Application Priority Data

Aug. 21, 2024 (JP) ................................ 2024-140067

(51) Int. Cl.
*G03G 15/20* (2006.01)

(52) U.S. Cl.
CPC ..... *G03G 15/2057* (2013.01); *G03G 15/2064* (2013.01)

(58) Field of Classification Search
USPC .......................................................... 399/328
See application file for complete search history.

(56) References Cited

U.S. PATENT DOCUMENTS

| | | | | |
|---|---|---|---|---|
| 9,104,145 | B2 | 8/2015 | Okabayashi et al. | |
| 10,906,277 | B2 | 2/2021 | Tsujikawa et al. | |
| 12,111,590 | B2 | 10/2024 | Omori et al. | |
| 2004/0131401 | A1 * | 7/2004 | Nakatogawa ...... | G03G 15/2053 399/328 |

FOREIGN PATENT DOCUMENTS

| | | |
|---|---|---|
| JP | 2006091499 | 4/2006 |
| JP | 4534691 | 9/2010 |
| JP | 4543670 | 9/2010 |
| JP | 6142385 | 6/2017 |
| JP | 2024034951 | 3/2024 |
| WO | 2016021716 | 2/2016 |

OTHER PUBLICATIONS

"Search Report of Europe Counterpart Application", issued on Aug. 6, 2025, p. 1-p. 7.

* cited by examiner

*Primary Examiner* — Quana Grainger
(74) *Attorney, Agent, or Firm* — JCIPRNET

(57) ABSTRACT

A sliding member includes a sliding layer that contains a heat-resistant thermoplastic resin other than a fluororesin and talc particles, in which the talc particles are exposed on a sliding surface, and an average diameter of exposed portions of the talc particles is 0.1 μm or more and 15 μm or less.

20 Claims, 3 Drawing Sheets

SLIDING MEMBER CONTAINING TALC PARTICLES, IMAGE FIXING DEVICE, AND IMAGE FORMING APPARATUS

CROSS-REFERENCE TO RELATED APPLICATIONS

This application is based on and claims priority under 35 USC 119 from Japanese Patent Application No. 2024-140067 filed Aug. 21, 2024.

BACKGROUND

(i) Technical Field

The present disclosure relates to a sliding member, an image fixing device, and an image forming apparatus.

(ii) Related Art

JP2006-091499A discloses a fixing device that fixes a toner image carried on a recording material, the fixing device including a rotary member, a belt member that is movable while being in contact with the rotary member, a sliding member that is disposed to be in contact with an inner side of the belt member, and a pressure member that forms a nip portion through which the recording material passes between the rotary member and the belt member by pressing the belt member against the rotary member through the sliding member, in which the sliding member has a resin layer obtained by blending a heat-resistant resin and an interlayer peeling resistance filler on a sliding surface side in contact with the belt member.

WO2016/021716A discloses a low friction member that is formed of at least a lubricating material and a polyimide resin, has a surface roughness Rsk of 0.500 or more, and has a surface exposure rate of the lubricating material of 15.0% or more.

JP2024-034951A discloses a fixing device including a first rotating body, a second rotating body, a pressing member that presses the second rotating body against the first rotating body, a sliding member that is interposed between the second rotating body and the pressing member, and a lubricant that is interposed between the second rotating body and the sliding member, in which a sliding surface of the sliding member is formed of a heat-resistant thermoplastic resin other than a fluororesin and a resin having a siloxane group, and the lubricant contains an oil having a siloxane group as a main chain.

SUMMARY

Aspects of non-limiting embodiments of the present disclosure relate to a sliding member having excellent abrasion resistance of a sliding surface.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific methods for achieving the above-described object include the following aspects.

According to an aspect of the present disclosure, there is provided a sliding member including a sliding layer that contains a heat-resistant thermoplastic resin other than a fluororesin and talc particles, in which the talc particles are exposed on a sliding surface, and an average diameter of exposed portions of the talc particles is 0.1 μm or more and 15 μm or less.

BRIEF DESCRIPTION OF THE DRAWINGS

Exemplary embodiment(s) of the present invention will be described in detail based on the following figures, wherein.

DETAILED DESCRIPTION

Figure 1:
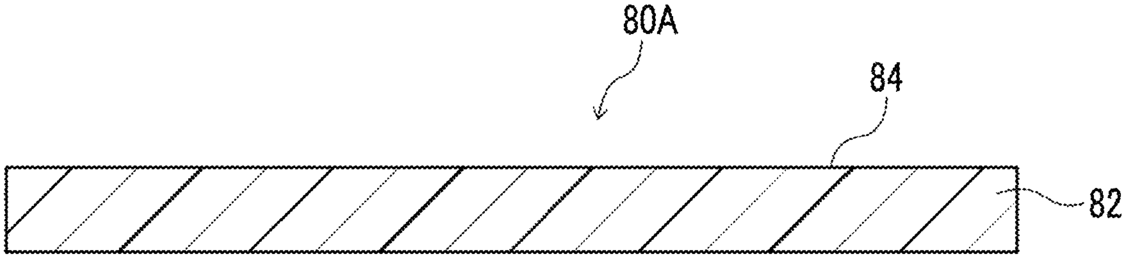
FIG. 1 is a schematic cross-sectional view showing an example of a layer configuration of a sliding member according to the present exemplary embodiment.

The exemplary embodiments of the present disclosure will be described below. The following descriptions and examples merely illustrate the exemplary embodiments, and do not limit the scope of the exemplary embodiments.

In the present disclosure, a numerical range described using "to" represents a range including numerical values listed before and after "to" as the minimum value and the maximum value respectively.

Regarding the numerical ranges described in stages in the present disclosure, the upper limit or lower limit of a numerical range may be replaced with the upper limit or lower limit of another numerical range described in stages. Furthermore, in the present disclosure, the upper limit or lower limit of a numerical range may be replaced with values described in examples.

In the present disclosure, the term "step" includes not only an independent step but a step that is not clearly distinguished from other steps as long as the purpose of the step is achieved.

In the present disclosure, in a case where an exemplary embodiment is described with reference to drawings, the configuration of the exemplary embodiment is not limited to the configuration shown in the drawings. The sizes of members in each drawing are conceptual and do not limit the relative relationship between the sizes of the members. The members having the same functions and operations are represented by the same reference numerals throughout the drawings, and descriptions thereof will not be repeated.

In the present disclosure, a plurality of kinds of substances corresponding to each component may be included. In a case where the amount of each component in a composition is mentioned in the present disclosure, and there is a plurality of kinds of substances corresponding to each component in the composition, unless otherwise specified, the amount of each component means the total amount of two or more kinds of the substances present in the composition.

In the present disclosure, a plurality of kinds of particles corresponding to each component may be included. In a case where there is a plurality of kinds of particles corresponding to each component in a composition, unless otherwise specified, the particle size of each component means a value for a mixture of two or more kinds of the particles present in the composition.

Sliding Member

The sliding member according to the present exemplary embodiment is a sheet-like member that is disposed between a rotating body and a pressing member pressing the rotating body.

The sliding member according to the present exemplary embodiment is used, for example, as a sliding member disposed in an image fixing device of an electrophotographic image forming apparatus.

The sliding member according to the present exemplary embodiment includes at least a sliding layer. An exposed surface of the sliding layer is a sliding surface that slides on a non-sliding member.

The sliding member according to the present exemplary embodiment may be a monolayer body consisting of only the sliding layer, or may be a laminate including a base layer and a sliding layer disposed on the base layer.

Figure 2:
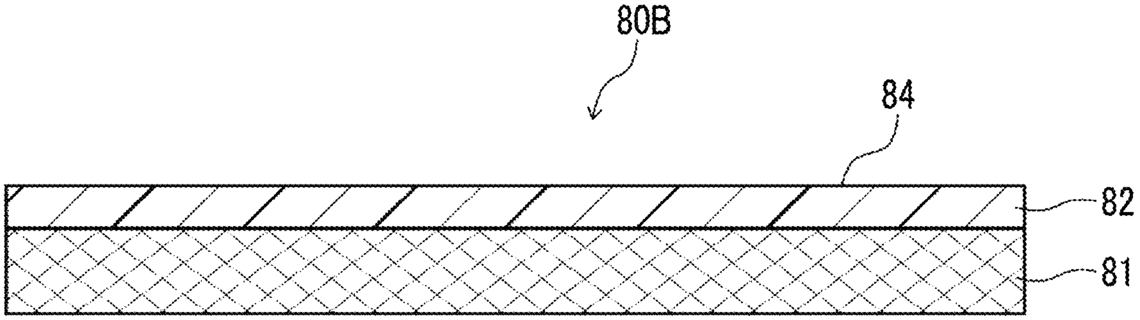
FIG. 2 is a schematic cross-sectional view showing another example of a layer configuration of a sliding member according to the present exemplary embodiment.

FIGS. 1 and 2 are schematic cross-sectional views showing an example of a layer configuration of the sliding member according to the present exemplary embodiment, and are cross-sectional views in a sliding direction and a thickness direction. FIGS. 1 and 2 are schematic views showing the layer configuration of the sliding member, in which materials contained in each layer are not shown.

A sliding member 80A shown in FIG. 1 is a single-layer sheet of only a sliding layer 82. The sliding layer 82 constitutes a sliding surface 84.

A sliding member 80B shown in FIG. 2 is a laminated sheet consisting of a base layer 81 and a sliding layer 82 provided on the base layer 81. The sliding layer 82 constitutes a sliding surface 84.

The sliding member according to the present exemplary embodiment has a sliding layer that contains a heat-resistant thermoplastic resin other than a fluororesin.

The fluororesin sheet is widely used as the sliding member because of excellent heat resistance and low friction resistance. However, in recent years, ecological toxicity and human toxicity of organic fluorine compounds have been reported, and regulations on production and use of the organic fluorine compounds have been strengthened worldwide. As the production and use of the organic fluorine compounds is increasingly restricted, there is an urgent need to develop a sliding member that can replace the fluororesin sheet.

Therefore, the present disclosure provides a sliding member having a sliding layer that contains a heat-resistant thermoplastic resin other than the fluororesin.

The sliding member according to the present exemplary embodiment includes a sliding layer that contains a heat-resistant thermoplastic resin other than a fluororesin and talc particles, in which the talc particles are exposed on a sliding surface, and an average diameter of exposed portions of the talc particles is 0.1 μm or more and 15 μm or less.

The sliding member having the above-described configuration has excellent abrasion resistance of the sliding surface. The mechanism is assumed as follows.

First, since the talc particles are exposed on the sliding surface, micro roughness is present on the sliding surface, and thus frictional resistance of the sliding surface is reduced. In addition, since the talc particles are particles exhibiting cleavability, the exposed portion of the talc particles are gradually scraped off during sliding, and talc powder is transferred to a slide member. The talc powder adhering to the surface of the slide member suppresses generation of abrasion powder of the slide member. By these actions, the abrasion resistance of the sliding surface is improved.

In the sliding member according to the present exemplary embodiment, the talc particles are exposed on the sliding surface, and an average diameter of the exposed portions of the talc particles is 0.1 μm or more and 15 μm or less.

In a case where the average diameter of the exposed portions of the talc particles is more than 15 μm, the talc particles are likely to be detached from the sliding surface, and thus may not contribute to the abrasion resistance of the sliding surface. From the viewpoint of improving the abrasion resistance of the sliding surface, the average diameter of the exposed portions of the talc particles is 15 μm or less, for example, preferably 8 μm or less and more preferably 7 μm or less.

In a case where the average diameter of the exposed portions of the talc particles is less than 0.1 μm, the exposed portion of the talc particles is too small, and thus the talc particles may not contribute to the abrasion resistance of the sliding surface. From the viewpoint of improving the abrasion resistance of the sliding surface, the average diameter of the exposed portions of the talc particles is 0.1 μm or more, for example, preferably 0.5 μm or more and more preferably 1 μm or more.

In the sliding member according to the present exemplary embodiment, an area proportion of the exposed portion of the talc particles in the sliding surface is, for example, preferably 2% or more and 10% or less.

In a case where the area proportion of the exposed portion of the talc particles is 10% or less, the talc particles are less likely to be detached, and thus the abrasion resistance of the sliding surface is more excellent. From the viewpoint, the area proportion of the exposed portion of the talc particles is, for example, more preferably 8% or less and still more preferably 6% or less.

In a case where the area proportion of the exposed portion of the talc particles is 2% or more, the exposed amount of the talc particles is moderate, and thus the abrasion resistance of the sliding surface is more excellent. From the viewpoint, the area proportion of the exposed portion of the talc particles is, for example, more preferably 3% or more and still more preferably 4% or more.

A method of measuring the average diameter and the area proportion of the exposed portion of the talc particles on the sliding surface of the sliding member is as follows.

The sliding surface of the sliding member is observed from directly above with a scanning electron microscope (SEM). Images at three or more sites are acquired at a magnification of 2,000 times. A binarization treatment is performed using image analysis software ImageJ to detect the exposed portion of the talc particles.

Equivalent circle diameters of 100 randomly selected exposed portions are obtained, and an arithmetic mean of the equivalent circle diameters is defined as the average diameter of the exposed portions.

An area proportion of the exposed portion of each observation site is obtained, and a value obtained by arithmetically averaging these area proportions is defined as the area proportion of the exposed portion.

The average diameter and the area proportion of the exposed portion of the talc particles can be controlled by a particle diameter and a content of the talc particles contained in the sliding layer. Ranges of the particle diameter and the content of the talc particles are as described later.

From the viewpoint of more excellent abrasion resistance of the sliding surface, the maximum height Rz (JIS B0601:

2013) of the roughness curve of the sliding surface of the sliding member according to the present exemplary embodiment is, for example, preferably 1.0 μm or more and 6.0 μm or less, more preferably 2.0 μm or more and 5.8 μm or less, and still more preferably 3.0 μm or more and 5.6 μm or less.

From the viewpoint of excellent abrasion resistance of the sliding surface, a skewness Rsk (JIS B0601: 2013) of the roughness curve of the sliding surface of the sliding member according to the present exemplary embodiment is, for example, preferably 0 or more and 1.0 or less, more preferably 0 or more and 0.6 or less, and still more preferably 0 or more and 0.45 or less. The value of the skewness Rsk is, for example, preferably closer to 0 in the range.

The maximum height Rz and the skewness Rsk of the roughness curve of the sliding surface of the sliding member are values obtained by a measurement method and a calculation method specified in JIS B0601: 2013.

The roughness curve is measured using a contact surface roughness measuring instrument (SURFCOM, Tokyo Seimitsu Co., Ltd.) in an environment of a temperature of 23° C. and a relative humidity of 55%. The measurement is performed by scanning a center portion of the sliding surface in the sliding direction with a scanning speed of 0.3 mm/sec, a measurement length of 4.0 mm, and a cutoff value of 2.67 μm. A stylus has a conical shape with an apex angle of 90°, a curvature radius of a tip is 5 μm, and a tip material is diamond.

The maximum height Rz and the skewness Rsk of the roughness curve relating to the sliding surface of the sliding member can be controlled by a particle diameter and a content of the talc particles contained in the sliding layer. Ranges of the particle diameter and the content of the talc particles are as described later.

From the viewpoint of excellent abrasion resistance of the sliding surface, in the sliding member according to the present exemplary embodiment, for example, it is preferable that the average diameter of the exposed portions of the talc particles of the sliding surface is 0.5 μm or more and 8 μm or less, the area proportion of the exposed portion of the talc particles in the sliding surface is 3% or more and 8% or less, and the maximum height Rz of the roughness curve of the sliding surface is 3.0 μm or more and 5.6 μm or less.

In the present exemplary embodiment, the skewness Rsk of the roughness curve of the sliding surface is, for example, preferably 0 or more and 0.45 or less.

Hereinafter, the sliding layer and the base layer will be each described in detail.

Sliding Layer

The sliding layer contains a heat-resistant thermoplastic resin other than a fluororesin, and talc particles.

The heat-resistant thermoplastic resin is, for example, preferably a resin having heat resistance that does not melt and decompose at a temperature (approximately 250° C.) at which the image fixing device is provided.

The heat-resistant thermoplastic resin is, for example, preferably a resin that exhibits flexibility in a form of a resin sheet at a temperature (approximately 250° C.) at which the image fixing device is provided and can follow the shape of the pressing member and the rotating body.

Furthermore, the heat-resistant thermoplastic resin is, for example, preferably a resin having excellent toughness and abrasion resistance and low friction resistance in a form of a resin sheet.

From the above-described viewpoints, examples of the heat-resistant thermoplastic resin include a polyimide resin, a polyamide-imide resin, a polyether ether ketone resin, a polyphenylene sulfide resin, a polyether sulfone resin, a polysulfone resin, and a polyphenylsulfone resin.

From the above-described viewpoints, for example, the heat-resistant thermoplastic resin preferably includes at least one selected from the group consisting of a polyether ether ketone resin, a polyphenylene sulfide resin, a polyether imide resin, a polyamide resin, and a polyphenylsulfone resin.

A particle shape of the talc particles is not limited, and may be any of a spherical shape, an elliptical shape, a plate shape, or an irregular shape.

From the viewpoint of easily controlling the average diameter of the exposed portions of the talc particles within an appropriate range, an average primary particle diameter of the talc particles is, for example, preferably 0.2 μm or more and 20 μm or less, more preferably 0.5 μm or more and 15 μm or less, and still more preferably 1 μm or more and 10 μm or less.

The average primary particle diameter of the talc particles is obtained by measuring major diameters of 100 talc particles randomly selected in observation with a scanning electron microscope (SEM) and averaging the 100 major diameters. A sample for the SEM observation is talc particles that are a material for forming the sliding layer, or talc particles taken out from the sliding layer. A method of taking out the talc particles from the sliding layer is not limited. The method is, for example, a method of dipping the sliding layer in an organic solvent to dissolve the resin and take out the talc particles; a method of heating the sliding layer to approximately 800° C. to eliminate the resin and take out the talc particles; and the like.

A content of the talc particles is, for example, preferably 1% by mass or more and 10% by mass or less, more preferably 3% by mass or more and 8% by mass or less, and still more preferably 4% by mass or more and 6% by mass or less with respect to the mass of the sliding layer.

In the sliding member 80A shown in FIG. 1, a thickness of the sliding layer is, for example, preferably 50 μm or more and 120 μm or less, more preferably 60 μm or more and 110 μm or less, and still more preferably 70 μm or more and 100 μm or less.

In the sliding member 80B shown in FIG. 2, a thickness of the sliding layer is, for example, preferably 5 μm or more and 60 μm or less, more preferably 10 μm or more and 50 μm or less, and still more preferably 20 μm or more and 40 μm or less.

The thickness of the sliding layer is a value obtained by measuring layer thicknesses at approximately 10 locations with an eddy current film thickness meter, and arithmetically averaging the values.

In the sliding layer, a proportion of the fluororesin in the layer is, for example, preferably 5% by mass or less, more preferably 1% by mass or less, and still more preferably 0% by mass (that is, the sliding layer does not contain the fluororesin).

Since there is a high possibility that the regulations on production and use of the organic fluorine compound is strengthened in the future, the content of the fluororesin is, for example, preferably within the above-described range.

Base Layer

The base layer is preferably, for example, a layer having high heat resistance that is difficult to melt even at a high temperature.

Examples of the base layer include a heat-resistant fiber sheet. Examples of the heat-resistant fiber include a glass fiber, a carbon fiber, a ceramic fiber (for example, an alumina fiber and a silica fiber), a heat-resistant resin fiber (for example, an aramid fiber and a polypropylene fiber), and a metal fiber (for example, a carbon steel fiber, a stainless steel fiber, and a plated steel fiber). The heat-resistant fiber sheet may be woven fabric (for example, plain weave) or nonwoven fabric.

Typical examples of the base layer include woven glass fiber (glass cloth) and nonwoven glass fiber (glass mat).

In the sliding member 80B shown in FIG. 2, a thickness of the base layer is, for example, preferably 100 μm or more and 200 μm or less, more preferably 110 μm or more and 180 μm or less, and still more preferably 120 μm or more and 150 μm or less.

The thickness of the base layer is a value obtained by measuring layer thicknesses at approximately 10 locations with an eddy current film thickness meter, and arithmetically averaging the values.

An adhesive layer may be provided between the base layer and the sliding layer as necessary.

Manufacturing Method of Sliding Member

The sliding member 80A shown in FIG. 1 can be manufactured by extruding and molding a material into a sheet shape. For example, a compound is produced by melt-kneading the heat-resistant thermoplastic resin and the talc particles, and the compound is subjected to extrusion molding to obtain a resin sheet (that is, the sliding member).

The sliding member 80B shown in FIG. 2 can be manufactured by disposing a resin sheet as the sliding layer on the base layer and bonding the layers to each other by applying pressure and heat from above and below the laminate.

Image Fixing Device

The image fixing device according to the present exemplary embodiment is a device that includes a first rotating body and a second rotating body disposed in contact with an outer peripheral surface of the first rotating body, and fixes a toner image to a recording medium by passing the recording medium on which the toner image is formed on a surface through a contact portion between the first rotating body and the second rotating body.

The image fixing device according to the present exemplary embodiment includes a pressing member that is disposed inside the second rotating body and presses the second rotating body against the first rotating body from an inner peripheral surface of the second rotating body, and includes the sliding member according to the present exemplary embodiment that is disposed between the second rotating body and the pressing member.

In the image fixing device according to the present exemplary embodiment, for example, it is preferable that at least one of the first rotating body or the second rotating body is a rotating body that applies heat to the recording medium.

Hereinafter, an example of the image fixing device according to the present exemplary embodiment will be described with reference to FIG. 3.

Figure 3:
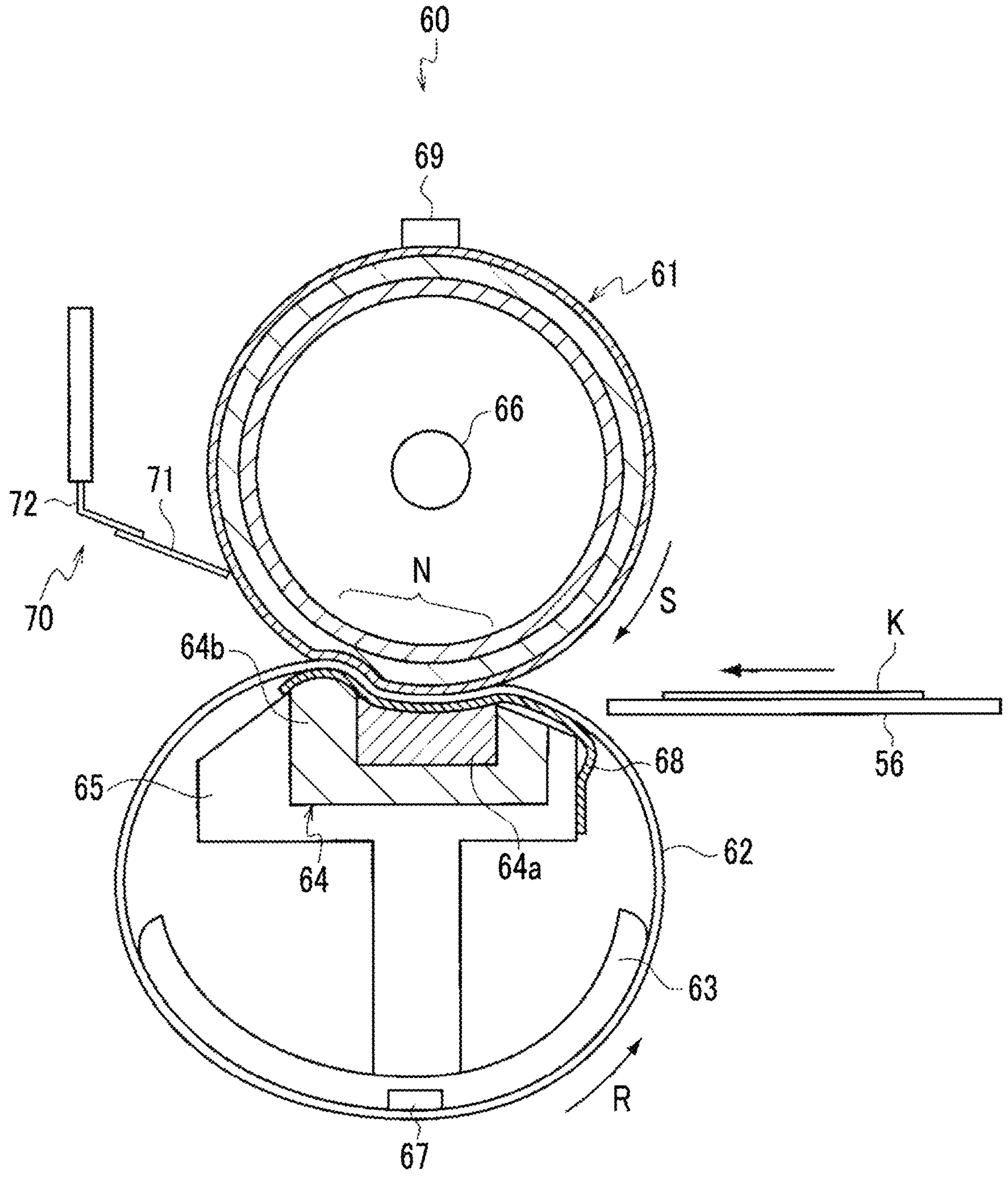
FIG. 3 is a view schematically showing a configuration of an example of an image fixing device according to the present exemplary embodiment.

FIG. 3 is a schematic configuration view of an image fixing device 60 including a heating roll 61 (an example of the first rotating body) and a pressure belt 62 (an example of the second rotating body).

A halogen lamp 66 (an example of a heating unit) is disposed in the heating roll 61. A temperature-sensitive element 69 is disposed in contact with a surface of the heating roll 61. Lighting of the halogen lamp 66 is controlled based on a temperature measurement value by the temperature-sensitive element 69, and a surface temperature of the heating roll 61 is maintained at a target set temperature.

The pressure belt 62 is rotatably supported by a pressing pad 64 and a belt traveling guide 63 that are disposed inside the pressure belt 62.

The pressing pad 64 presses the pressure belt 62 against the heating roll 61. The pressure belt 62 is pressed against the heating roll 61 by the pressing pad 64, so that a nip region N (nip portion) is formed.

The pressing pad 64 includes a nip member 64*a* and a nip member 64*b*. The nip member 64*a* is disposed on an entrance side of the nip region N to ensure a wide nip region N. The nip member 64*b* is disposed on an exit side of the nip region N to cause strain on the heating roll 61 and to facilitate the peeling of the recording medium.

A sheet-like sliding member 68 (an example of the sliding member according to the present exemplary embodiment) is disposed between the pressing pad 64 and the pressure belt 62 to reduce a sliding resistance between an inner peripheral surface of the pressure belt 62 and the pressing pad 64. The pressing pad 64 and the sliding member 68 are held by a holding member 65 made of metal. The belt traveling guide 63 is mounted on the holding member 65. A lubricant supply device 67 that is a unit supplying a lubricant to the inner peripheral surface of the pressure belt 62 is attached to the belt traveling guide 63.

Examples of the lubricant include silicone oil and modified silicone oil. Examples of the modified silicone oil include an alkyl-modified silicone oil (such as a dimethyl-modified silicone oil), an amino-modified silicone oil, a methylphenyl-modified silicone oil, an epoxy-modified silicone oil, a phenol-modified silicone oil, a polyether-modified silicone oil, and a fluorine-modified silicone oil.

A layer constituting the inner peripheral surface of the pressure belt 62 is preferably, for example, a resin layer that is excellent in heat resistance, abrasion resistance, and toughness, and has high affinity with silicone oil that is the lubricant.

From the above-described viewpoint, examples of a resin material of the resin layer constituting the inner peripheral surface of the pressure belt 62 include a polyimide resin, a polyamide-imide resin, a polyether ether ketone resin, a polyphenylene sulfide resin, a polyether sulfone resin, a polysulfone resin, and a polyphenylsulfone resin. Among the above, for example, at least one resin selected from the group consisting of a polyimide resin, a polyamide-imide resin, a polyether ether ketone resin, and a polyphenylene sulfide resin is preferable, and a polyimide resin is more preferable.

A peeling member 70 is an auxiliary member for peeling off the recording medium from the image fixing device 60, and is disposed on the downstream side of the nip region N.

The peeling member 70 includes a peeling claw 71 and a holding member 72. The peeling claw 71 is held at a position close to the heating roll 61 by the holding member 72.

The heating roll 61 is rotationally driven by a drive motor (not shown). By the drive motor, the heating roll 61 is rotated in a direction of an arrow S, and the pressure belt 62 is rotated in a direction of an arrow R while following the rotation of the heating roll 61. A sheet K (an example of the recording medium) having an unfixed toner image is guided by a fixing entrance guide 56, and transported to the nip region N. When the sheet K passes through the nip region N, the toner image on the sheet K is fixed by pressure and heat.

Image Forming Apparatus

The image forming apparatus according to the present exemplary embodiment includes an image holder, a charging device that charges a surface of the image holder, an electrostatic latent image forming device that forms an electrostatic latent image on the charged surface of the image holder, a developing device that develops the electrostatic latent image with a toner to form a toner image, a transfer device that transfers the toner image to a recording medium, and the image fixing device according to the present exemplary embodiment, that fixes the toner image to the recording medium. The image fixing device may be a cartridge that can be attached to and detached from the image forming apparatus.

Figure 4:
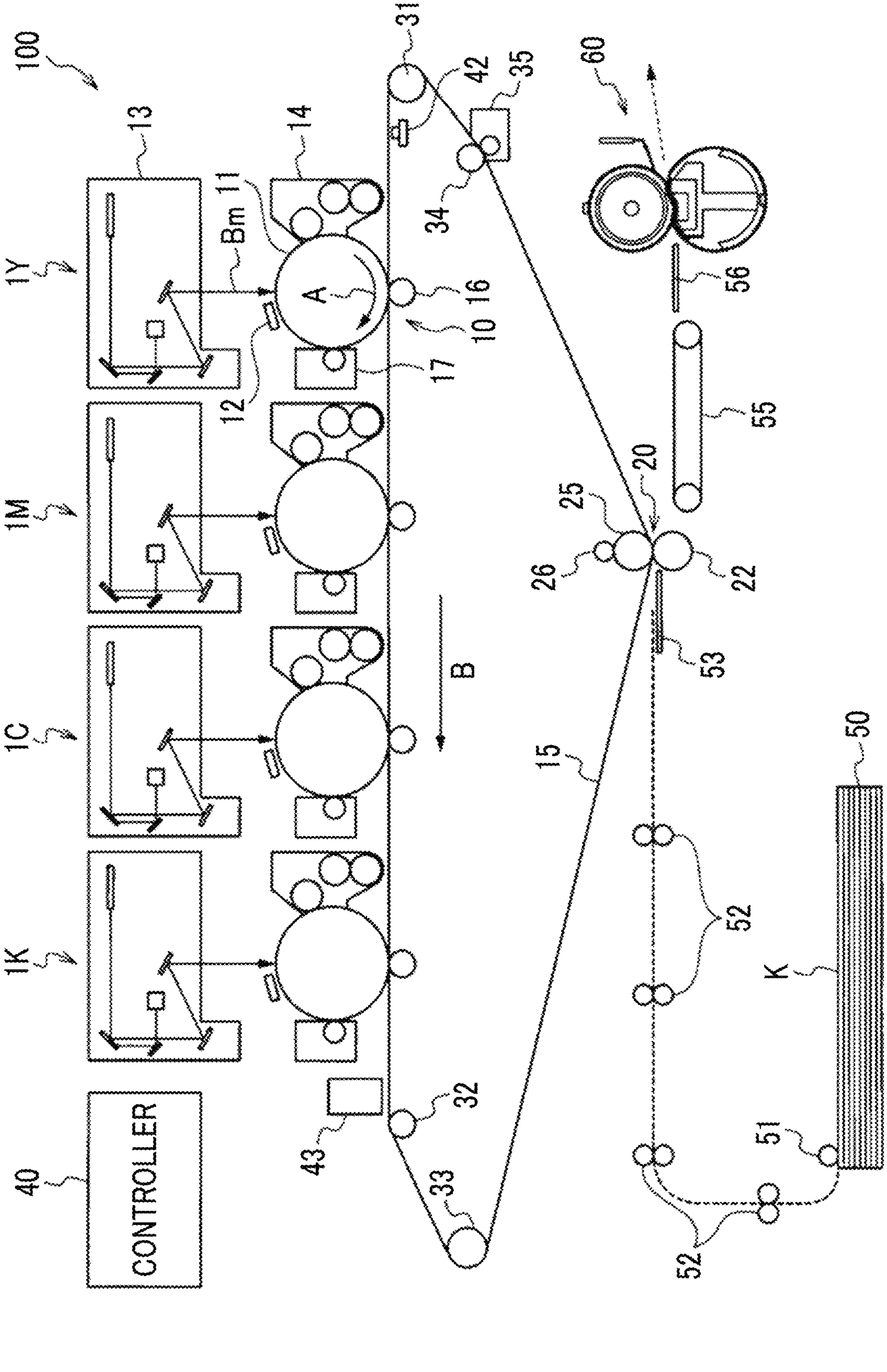
FIG. 4 is a view schematically showing a configuration of an example of an image forming apparatus according to the present exemplary embodiment.

FIG. 4 is a view schematically showing a configuration of an example of an image forming apparatus 100 according to the present exemplary embodiment. The image forming apparatus 100 includes the image fixing device 60 described above.

The image forming apparatus 100 is an intermediate transfer image forming apparatus that is generally called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the image fixing device 60 that fixes the secondarily transferred images onto the sheet K, and a controller 40 that controls the operation of each device (each unit).

The image forming units 1Y, 1M, 1C, and 1K are substantially linearly arranged in the order of 1Y (unit for yellow), 1M (unit for magenta), 1C (unit for cyan), and 1K (unit for black) from the upstream side of the intermediate transfer belt 15.

Each of the image forming units 1Y, 1M, 1C, and 1K includes a photoreceptor 11 (an example of the image holder). The photoreceptor 11 is rotated in a direction of an arrow A.

A charging unit 12 (an example of the charging device), a laser exposure unit 13 (an example of the electrostatic latent image forming device), a developing unit 14 (an example of the developing device), a primary transfer roller 16, and a photoreceptor cleaner 17 are sequentially arranged around the photoreceptor 11 in a rotation direction of the photoreceptor 11.

The charging unit 12 charges a surface of the photoreceptor 11.

The laser exposure unit 13 emits an exposure beam Bm to form an electrostatic latent image on the photoreceptor 11.

The developing unit 14 stores toner having each color, develops the electrostatic latent image formed on the photoreceptor 11 into a visible image with the toner, and thus forms a toner image on the photoreceptor 11.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt consisting of a material in which an antistatic agent, such as carbon black, is added to a resin, such as polyimide or polyamide. The intermediate transfer belt 15 has a volume resistivity of, for example, $1\times10^{6}$ Ω·cm or more and $1\times10^{14}$ Ω·cm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow B according to the rotation of the drive roller 31.

The drive roller 31 is driven by a motor (not shown) having an excellent constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses meandering of the intermediate transfer belt 15.

The back roller 25 is provided in the secondary transfer unit 20, and the cleaning back roller 34 is provided in a cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity; the same applies hereinafter) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The primary transfer roller 16 has a volume resistivity of, for example, $1\times10^{7.5}$ Ω·cm or more and $1\times10^{8.5}$ Ω·cm or less.

A secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The secondary transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is covered with a tube made of blended rubber in which carbon is dispersed, so that the back roller 25 is formed. The back roller 25 has a surface resistivity of, for example, $1\times10^{7}$Ω/□ or more and $1\times10^{10}\Omega/\square$ or less, and has a hardness of, for example, 70° (Asker C, manufactured by Kobunshi Keiki Co., Ltd.; the same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 on the intermediate transfer belt 15 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 42 is provided on the upstream side of the image forming unit 1Y. The reference sensor 42 generates a reference signal that serves as a reference used to take an image formation timing in each image forming unit. The reference sensor 42 recognizes a mark provided on the back side of the intermediate transfer belt 15 and generates a reference signal, and the image forming units 1Y, 1M, 1C, and 1K start to form images according to an instruction given from the controller 40 that recognizes this reference signal.

An image density sensor 43 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as a transport unit for transporting a sheet K.

The sheet storage part 50 stores sheets K on which images are not yet formed.

The sheet feed roller 51 takes out a sheet K stored in the sheet storage part 50.

The transport rollers 52 transport the sheet K that is taken out by the sheet feed roller 51.

The transport guide 53 sends the sheet K, which is transported by the transport rollers 52, to the secondary transfer unit 20.

The transport belt 55 transports the sheet K, onto which images are transferred at the secondary transfer unit 20, to the image fixing device 60.

The fixing entrance guide 56 guides the sheet K to the image fixing device 60.

A method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input image data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit 10 where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a timing when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

The toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the image fixing device 60 by the transport belt 55.

The sheet K transported to the image fixing device 60 is heated and pressed by the image fixing device 60, so that the unfixed toner images are fixed.

An image is formed on the recording medium by the image forming apparatus 100 through the above-mentioned steps.

EXAMPLES

Hereinafter, exemplary embodiments of the invention will be specifically described based on examples. However, the exemplary embodiments of the invention are not limited to the examples. In the following description, unless otherwise specified, "parts" and "%" are based on mass. In the following description, the synthesis, the treatment, the production, and the like are carried out at room temperature (25° C.±3° C.) unless otherwise specified.

Production of Sliding Member

Example 1

A compound having 5% by mass of talc particles, in which a polyether ether ketone resin and talc particles (average particle diameter: 5 μm, FUJIFILM Wako Pure Chemical Corporation) are pelletized, is obtained. The compound is subjected to extrusion molding at a die temperature of 380° C. and rapidly cooled to obtain a resin sheet (that is, a sliding member).

Comparative Example 1

A resin sheet (that is, a sliding member) is obtained in the same manner as in Example 1, except that the talc particles are changed to synthetic swelling mica (TOPY INDUSTRIES LIMITED.).

Comparative Example 2

A resin sheet (that is, a sliding member) is obtained in the same manner as in Example 1, except that the talc particles are changed to montmorillonite (KUNIPIA-F, KUNIMINE INDUSTRIES CO., LTD.).

Comparative Examples 3 and 4 and Examples 2 to 7

A resin sheet (that is, a sliding member) is obtained in the same manner as in Example 1, except that the average particle diameter of the talc particles used is changed.

Examples 8 and 9

A resin sheet (that is, a sliding member) is obtained in the same manner as in Example 1, except that the content of the talc particles in the compound is changed as shown in Table 1.

Example 10

A resin sheet (that is, a sliding member) is obtained in the same manner as in Example 1, except that the thickness is changed as shown in Table 1.

Example 11

A resin sheet (that is, a sliding member) is obtained in the same manner as in Example 1, except that the thickness is changed as shown in Table 1.

Example 12

A resin sheet (that is, a sliding member) is obtained in the same manner as in Example 1, except that the polyether ether ketone resin is changed to a polyphenylene sulfide resin and the die temperature of the extrusion molding is changed to 300° C.

Example 13

A resin sheet (that is, a sliding member) is obtained in the same manner as in Example 1, except that the polyether ether ketone resin is changed to a polyamide resin and the die temperature of the extrusion molding is changed to 320° C.

Example 14

A resin sheet (that is, a sliding member) is obtained in the same manner as in Example 1, except that the polyether ether ketone resin is changed to a polyether imide resin and the die temperature of the extrusion molding is changed to 250° C.

Example 15

A resin sheet (that is, a sliding member) is obtained in the same manner as in Example 1, except that the thickness is changed as shown in Table 1. A glass cloth (trade name: P0.05×1260, weight: 44.0 g/m$^2$, thickness: 60 μm, manufactured by Arisawa Manufacturing Co., Ltd.) is laminated on the resin sheet to obtain a laminated sheet (that is, a sliding member).

Example 16

A resin sheet (that is, a sliding member) is obtained in the same manner as in Example 1, except that the thickness is changed as shown in Table 1. A glass cloth (trade name: P0.05×1260, weight: 44.0 g/m$^2$, thickness: 60 μm, manufactured by Arisawa Manufacturing Co., Ltd.) is laminated on the resin sheet to obtain a laminated sheet (that is, a sliding member).

Performance Evaluation

Abrasion Resistance of Sliding Surface of Sliding Member

The sliding member of each example is made to face a polyimide sheet, and a friction and wear test is performed using a friction and wear tester FPR-2100 (RHESCA CO., LTD.). Conditions of the friction and wear test are a load of 0.5 MPa, a temperature of 200° C., a linear speed of 450 m/sec, and 1 hour. The mass of the sliding member is measured before and after the friction and wear test, a mass change rate ((Mass before test-Mass after test)/Mass before test; percentage) is calculated, and the results are classified as follows. The results are shown in Table 1.

A: rate of change in mass is 0.5% or less.

B: rate of change in mass is 1.0% or less.

C: rate of change in mass is 2.0% or less.

D: rate of change in mass is more than 2.0%.

TABLE 1

| | Base layer — | Sliding layer (resin sheet): Resin Type — | Particles: Type — | Particles: Content % by mass | Layer thickness μm | Sliding surface: Exposed portion of particles: Average diameter μm | Exposed portion of particles: Area proportion % | Roughness curve: Rz μm | Roughness curve: Rsk — | Performance: Abrasion resistance — |
|---|---|---|---|---|---|---|---|---|---|---|
| Comparative Example 1 | — | PEEK | Synthetic swelling mica | 5 | 75 | 10 | 3 | 1.9 | 0.45 | D |
| Comparative Example 2 | — | PEEK | Montmorillonite | 5 | 75 | 0.5 | 5 | 0.6 | 0.30 | D |

TABLE 1-continued

| | | Sliding layer (resin sheet) | | | | Sliding surface | | | | Performance |
|---|---|---|---|---|---|---|---|---|---|---|
| | | | Particles | | | Exposed portion of particles | | Roughness curve | | |
| | Base layer — | Resin Type — | Type — | Content % by mass | Layer thickness µm | Average diameter µm | Area proportion % | Rz µm | Rsk — | Abrasion resistance — |
| Comparative Example 3 | — | PEEK | Talc | 5 | 75 | 0.08 | 1.8 | 0.9 | 0.09 | D |
| Example 2 | — | PEEK | Talc | 5 | 75 | 0.1 | 2 | 1.0 | 0.10 | C |
| Example 3 | — | PEEK | Talc | 5 | 75 | 0.4 | 5 | 2.7 | 0.40 | B |
| Example 4 | — | PEEK | Talc | 5 | 75 | 0.5 | 5 | 3.0 | 0.40 | A |
| Example 1 | — | PEEK | Talc | 5 | 75 | 5 | 5 | 5.1 | 0.40 | A |
| Example 5 | — | PEEK | Talc | 5 | 75 | 8 | 5 | 5.6 | 0.40 | A |
| Example 6 | — | PEEK | Talc | 5 | 75 | 9 | 5 | 5.7 | 0.40 | B |
| Example 7 | — | PEEK | Talc | 5 | 75 | 15 | 10 | 6.0 | 1.00 | C |
| Comparative Example 4 | — | PEEK | Talc | 5 | 75 | 15.5 | 11 | 6.5 | 1.20 | D |
| Example 8 | — | PEEK | Talc | 3.8 | 75 | 5 | 2.9 | 2.3 | 0.40 | C |
| Example 9 | — | PEEK | Talc | 4 | 75 | 5 | 3 | 2.6 | 0.40 | B |
| Example 10 | — | PEEK | Talc | 5 | 60 | 5 | 5 | 5.6 | 0.45 | B |
| Example 11 | — | PEEK | Talc | 5 | 50 | 5 | 5 | 5.8 | 0.50 | C |
| Example 12 | — | PPS | Talc | 5 | 75 | 5 | 5 | 5.1 | 0.40 | A |
| Example 13 | — | PA | Talc | 5 | 75 | 5 | 5 | 5.1 | 0.40 | A |
| Example 14 | — | PEI | Talc | 5 | 75 | 5 | 5 | 5.1 | 0.40 | A |
| Example 15 | Glass cloth | PEEK | Talc | 5 | 40 | 5 | 5 | 5.1 | 0.40 | A |
| Example 16 | Glass cloth | PPS | Talc | 5 | 40 | 5 | 5 | 5.1 | 0.40 | A |

Abbreviations in Table 1 have the following meanings.
PEEK: polyether ether ketone
PPS: polyphenylene sulfide
PA: polyamide
PEI: polyether imide Abbreviations in Table 1 have the following meanings.
PEEK: polyether ether ketone
PPS: polyphenylene sulfide
PA: polyamide
PEI: polyether imide The sliding member, the image fixing device, and the image forming apparatus according to the present disclosure include the following aspects.

Supplementary Notes (((1)))

A sliding member comprising:

a sliding layer that contains a heat-resistant thermoplastic resin other than a fluororesin and talc particles, wherein the talc particles are exposed on a sliding surface, and an average diameter of exposed portions of the talc particles is 0.1 µm or more and 15 µm or less.

(((2)))

The sliding member according to (((1))), wherein the average diameter of the exposed portions of the talc particles is 0.5 µm or more and 8 µm or less.

(((3)))

The sliding member according to (((1))) or (((2))), wherein an area proportion of the exposed portion of the talc particles in the sliding surface is 2% or more and 10% or less.

(((4)))

The sliding member according to (((1))) or (((2))), wherein an area proportion of the exposed portion of the talc particles in the sliding surface is 3% or more and 8% or less.

(((5)))

The sliding member according to any one of (((1))) to (((4))), wherein a maximum height Rz of a roughness curve of the sliding surface is 1.0 µm or more and 6.0 µm or less.

(((6)))

The sliding member according to any one of (((1))) to (((5))), wherein a skewness Rsk of a roughness curve of the sliding surface is 0 or more and 1.0 or less.

(((7)))

The sliding member according to any one of (((1))) to (((5))), wherein a skewness Rsk of a roughness curve of the sliding surface is 0 or more and 0.6 or less.

(((8)))

The sliding member according to any one of (((1))) to (((7))), wherein the average diameter of the exposed portions of the talc particles is 0.5 µm or more and 8 µm or less, an area proportion of the exposed portion of the talc particles in the sliding surface is 3% or more and 8% or less, and a maximum height Rz of a roughness curve of the sliding surface is 3.0 µm or more and 5.6 µm or less.

(((9)))

The sliding member according to any one of (((1))) to (((8))), wherein the heat-resistant thermoplastic resin includes at least one selected from the group consisting of a polyether ether ketone resin, a polyphenylene sulfide resin, a polyether imide resin, a polyamide resin, and a polyphenylsulfone resin.

(((10)))

The sliding member according to any one of (((1))) to (((9))), further comprising:

a base layer on which the sliding layer is disposed, wherein the base layer is a fiber sheet.

(((11)))

An image fixing device comprising:

a first rotating body;

a second rotating body that is disposed to be in contact with an outer peripheral surface of the first rotating body;

a pressing member that is disposed inside the second rotating body and presses the second rotating body against the first rotating body from an inner peripheral surface of the second rotating body; and the sliding member according to any one of (((1))) to (((10))) that is disposed between the second rotating body and the pressing member.

(((12)))

An image forming apparatus comprising:

an image holder;

a charging device that charges a surface of the image holder;

an electrostatic latent image forming device that forms an electrostatic latent image on the charged surface of the image holder;

a developing device that develops the electrostatic latent image with a toner to form a toner image;

a transfer device that transfers the toner image to a recording medium; and the image fixing device according to (((11))), that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sliding member comprising:

a sliding layer comprising a heat-resistant thermoplastic resin, other than a fluororesin, and talc particles, wherein the heat-resistant thermoplastic resin includes at least one selected from the group consisting of a polyimide resin, a polyamide-imide resin, a polyether ether ketone resin, a polyphenylene sulfide resin, a polyether sulfone resin, a polysulfone resin, a polyphenylsulfone resin, a polyether imide resin, and a polyamide resin, wherein the talc particles are exposed on a sliding surface, and an average diameter of exposed portions of the talc particles is 0.1 μm or more and 15 μm or less.

2. The sliding member according to claim 1, wherein the average diameter of the exposed portions of the talc particles is 0.5 μm or more and 8 μm or less.

3. The sliding member according to claim 1, wherein an area proportion of the exposed portion of the talc particles in the sliding surface is 2% or more and 10% or less.

4. The sliding member according to claim 1, wherein an area proportion of the exposed portion of the talc particles in the sliding surface is 3% or more and 8% or less.

5. The sliding member according to claim 1, wherein a maximum height Rz of a roughness curve of the sliding surface is 1.0 μm or more and 6.0 μm or less.

6. The sliding member according to claim 5, wherein a skewness Rsk of a roughness curve of the sliding surface is 0 or more and 1.0 or less.

7. The sliding member according to claim 5 wherein a skewness Rsk of a roughness curve of the sliding surface is 0 or more and 0.6 or less.

8. The sliding member according to claim 1, wherein the average diameter of the exposed portions of the talc particles is 0.5 μm or more and 8 μm or less, an area proportion of the exposed portion of the talc particles in the sliding surface is 3% or more and 8% or less, and a maximum height Rz of a roughness curve of the sliding surface is 3.0 μm or more and 5.6 μm or less.

9. The sliding member according to claim 1, wherein the heat-resistant thermoplastic resin includes at least one of the polyether ether ketone resin, the polyphenylene sulfide resin, the polyether imide resin, the polyamide resin, and the polyphenylsulfone resin.

10. The sliding member according to claim 1, further comprising:

a base layer on which the sliding layer is disposed, wherein the base layer is a fiber sheet.

11. An image fixing device comprising:

a first rotating body;

a second rotating body that is disposed to be in contact with an outer peripheral surface of the first rotating body;

a pressing member that is disposed inside the second rotating body and presses the second rotating body against the first rotating body from an inner peripheral surface of the second rotating body; and the sliding member according to claim 1 that is disposed between the second rotating body and the pressing member.

12. An image fixing device comprising:

a first rotating body;

a second rotating body that is disposed to be in contact with an outer peripheral surface of the first rotating body;

a pressing member that is disposed inside the second rotating body and presses the second rotating body against the first rotating body from an inner peripheral surface of the second rotating body; and the sliding member according to claim 2 that is disposed between the second rotating body and the pressing member.

13. An image fixing device comprising:

a first rotating body;

a second rotating body that is disposed to be in contact with an outer peripheral surface of the first rotating body;

a pressing member that is disposed inside the second rotating body and presses the second rotating body against the first rotating body from an inner peripheral surface of the second rotating body; and the sliding member according to claim 3 that is disposed between the second rotating body and the pressing member.

14. An image fixing device comprising:
a first rotating body;
a second rotating body that is disposed to be in contact with an outer peripheral surface of the first rotating body;
a pressing member that is disposed inside the second rotating body and presses the second rotating body against the first rotating body from an inner peripheral surface of the second rotating body; and
the sliding member according to claim 4 that is disposed between the second rotating body and the pressing member.

15. An image fixing device comprising:
a first rotating body;
a second rotating body that is disposed to be in contact with an outer peripheral surface of the first rotating body;
a pressing member that is disposed inside the second rotating body and presses the second rotating body against the first rotating body from an inner peripheral surface of the second rotating body; and
the sliding member according to claim 5 that is disposed between the second rotating body and the pressing member.

16. An image fixing device comprising:
a first rotating body;
a second rotating body that is disposed to be in contact with an outer peripheral surface of the first rotating body;
a pressing member that is disposed inside the second rotating body and presses the second rotating body against the first rotating body from an inner peripheral surface of the second rotating body; and
the sliding member according to claim 6 that is disposed between the second rotating body and the pressing member.

17. An image fixing device comprising:
a first rotating body;
a second rotating body that is disposed to be in contact with an outer peripheral surface of the first rotating body;
a pressing member that is disposed inside the second rotating body and presses the second rotating body against the first rotating body from an inner peripheral surface of the second rotating body; and
the sliding member according to claim 7 that is disposed between the second rotating body and the pressing member.

18. An image fixing device comprising:
a first rotating body;
a second rotating body that is disposed to be in contact with an outer peripheral surface of the first rotating body;
a pressing member that is disposed inside the second rotating body and presses the second rotating body against the first rotating body from an inner peripheral surface of the second rotating body; and
the sliding member according to claim 8 that is disposed between the second rotating body and the pressing member.

19. An image fixing device comprising:
a first rotating body;
a second rotating body that is disposed to be in contact with an outer peripheral surface of the first rotating body;
a pressing member that is disposed inside the second rotating body and presses the second rotating body against the first rotating body from an inner peripheral surface of the second rotating body; and
the sliding member according to claim 9 that is disposed between the second rotating body and the pressing member.

20. An image forming apparatus comprising:
an image holder;
a charging device that charges a surface of the image holder;
an electrostatic latent image forming device that forms an electrostatic latent image on the charged surface of the image holder;
a developing device that develops the electrostatic latent image with a toner to form a toner image;
a transfer device that transfers the toner image to a recording medium; and
the image fixing device according to claim 11, that fixes the toner image to the recording medium.

* * * * *